US008909051B2

(12) United States Patent
Zulfiqar et al.

(10) Patent No.: US 8,909,051 B2
(45) Date of Patent: Dec. 9, 2014

(54) OPPORTUNISTIC BANDWIDTH STEALING IN OPTICAL NETWORKS

(71) Applicant: Oracle International Corporation, Redwood City, CA (US)

(72) Inventors: Arslan Zulfiqar, Madison, WI (US); Pranay Koka, Austin, TX (US); Herbert D. Schwetman, Jr., Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 198 days.

(21) Appl. No.: 13/648,140

(22) Filed: Oct. 9, 2012

(65) Prior Publication Data

US 2014/0133861 A1    May 15, 2014

(51) Int. Cl.
*H04J 14/02* (2006.01)
*H04B 10/12* (2006.01)
*H04B 10/00* (2013.01)
*G02B 6/12* (2006.01)

(52) U.S. Cl.
CPC ......... *H04J 14/0257* (2013.01); *H04J 14/0275* (2013.01); *H04J 14/0256* (2013.01); *H04J 14/0278* (2013.01); *H01J 14/0273* (2013.01); *H01J 14/0284* (2013.01)
USPC ................ 398/79; 398/141; 398/164; 385/14

(58) Field of Classification Search
USPC ........................ 398/36, 58, 67, 139, 142, 164
See application file for complete search history.

(56) References Cited

U.S. PATENT DOCUMENTS

| | | | |
|---|---|---|---|
| 7,827,459 B1 * | 11/2010 | Zhou et al. | 714/749 |
| 2010/0014852 A1 * | 1/2010 | O'Krafka et al. | 398/1 |
| 2010/0223533 A1 * | 9/2010 | Stockhammer et al. | 714/776 |

OTHER PUBLICATIONS

Xu, Yi et al. "Channel Borrowing: An Energy-Efficient Nanophotonic Crossbar Architecture with Light-Weight Arbitration", ICS'12, Jun. 25-29, 2019, San Servolo Island, Venice Italy.
Sundberg, Carl-Erik W. "Erasure and Error Decoding for Semiconductor Memories", IEEE Transaction on Computers, vol. C-27, No. 8, Aug. 1978, 0018-9340/78/0800-06996$00.75 1978 IEEE.
Vantrease, Dana et al. "Corona: System Implications of Emerging Nanophotonic Technology", International Symposium on Computer Architecture, 1063-6897/08 $25.00 2008 IEEE DOI 10.1109/ISCA.2008.35.

(Continued)

*Primary Examiner* — David Payne
*Assistant Examiner* — Casey Kretzer
(74) *Attorney, Agent, or Firm* — Park, Vaughan, Fleming & Dowler LLP; Steven E. Stupp

(57) ABSTRACT

In a multi-chip module (MCM), integrated circuits are coupled by optical waveguides that convey optical signals. The optical waveguides provide dedicated point-to-point optical links between all pairs of the integrated circuits. Moreover, for a given point-to-point optical link between a given pair of integrated circuits, other integrated circuits in the integrated circuits steal access on the given point-to-point optical link when communicating information to one of the given pair of integrated circuits so that the given point-to-point optical link is shared by more than the given pair of integrated circuits. Furthermore, the integrated circuits recover errors in messages in the optical signals corrupted by collisions on the given point-to-point optical link using erasure coding. In this way, the MCM may provide an optical network with increased bandwidth relative to a point-to-point optical network.

15 Claims, 14 Drawing Sheets

(56) References Cited

OTHER PUBLICATIONS

Vantrease, Dana et al. "Light Speed Arbitration and Flow Control for Nanophotonic Interconnects", Micro '09, Dec. 12-16, 2009, New York, NY USA. Copyright 2009 ACM 978-1-60558-798-1/09/12 . . . $10.00.

Koka, Pranay et al., "A Micro-architectural Analysis of Switched Photonic Multi-chip Interconnects", 39th International Symposium on Computer Architecture (ISCA 2012), Jun. 9-13, 2012, Portland, OR, USA 2012, http//ieeexplore.ieee.org/xpl/mostRecentIssue.jsp?punumber=6230820.

* cited by examiner

```
                                                              ┌─ 1400
┌─────────────────────────────────────────────────────────┐
│  COMMUNICATE OPTICAL SIGNALS BETWEEN A PAIR OF INTEGRATED│
│  CIRCUITS USING A DEDICATED POINT-TO-POINT OPTICAL LINK  │
│           BETWEEN THE PAIR OF INTEGRATED CIRCUITS        │
│                          1410                            │
└─────────────────────────────────────────────────────────┘
                              │
                              ▼
┌─────────────────────────────────────────────────────────┐
│  STEAL ACCESS ON THE POINT-TO-POINT OPTICAL LINK USING   │
│  ONE OR MORE OTHER INTEGRATED CIRCUITS WITHOUT ARBITRATION│
│  WHEN COMMUNICATING INFORMATION TO ONE OF THE PAIR OF    │
│                    INTEGRATED CIRCUITS                   │
│                          1412                            │
└─────────────────────────────────────────────────────────┘
                              │
                              ▼
┌─────────────────────────────────────────────────────────┐
│  RECOVER ERRORS IN MESSAGES IN THE OPTICAL SIGNALS       │
│  CORRUPTED BY COLLISION ON THE POINT-TO-POINT OPTICAL    │
│              LINK USING ERASURE CODING                   │
│                          1414                            │
└─────────────────────────────────────────────────────────┘
```

FIG. 14

OPPORTUNISTIC BANDWIDTH STEALING IN OPTICAL NETWORKS

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure generally relates to optical networks. More specifically, the present disclosure relates to a multi-chip module (MCM) that includes integrated circuits that communicate via an optical network, dedicated point-to-point optical links and opportunistic stealing of communication bandwidth.

2. Related Art

Wavelength division multiplexing (WDM), which allows a single optical connection to carry multiple optical links or channels, can provide: very high bit-rates, very high bandwidth densities and very low power consumption. As a consequence, researchers are investigating the use of WDM to facilitate inter-chip communication. For example, in one proposed architecture chips (which are sometimes referred to as 'sites') in an array (which is sometimes referred to as a multi-chip module or MCM, or a 'macrochip') are coupled together by an optical network that includes optical interconnects (such as silicon optical waveguides).

In order to use photonic technology in interconnect applications, an efficient design is needed for the optical network. In particular, the optical network typically needs to provide: a high total peak bandwidth; a high bandwidth for each logical connection between any two sites in the array; low arbitration and connection setup overheads; low power consumption; and bandwidth reconfigurability.

A variety of optical network topologies having different characteristics and contention scenarios have been proposed to address these challenges in interconnect applications. One existing optical network topology, a static WDM point-to-point optical network, is shown in FIG. 1. In this optical network topology, an array of integrated circuits or chips 0-3 (which are each located at a 'site' in the array) are coupled by silicon optical waveguides using two carrier wavelengths (represented by the solid and dotted arrows). Note that the optical network in FIG. 1 is a fully connected point-to-point optical network. In particular, each site has a dedicated optical link or channel to every other site. Links to all the sites in a column of the array (which are conveyed by different carrier wavelengths output by non-tunable light sources) may be multiplexed using WDM onto a single waveguide that runs from the source site and visits each site in the column, where a carrier wavelength-selective 'drop filter' redirects one of the multiplexed carrier wavelengths to a destination site (in this case, the drop filters in row 1 pick off the first carrier wavelength, and the drop filters in row 2 pick off the second carrier wavelength, so the carrier wavelength is used for routing). As illustrated by the bold line, in FIG. 1 chip 0 communicates with chips 1 and 3.

A key property of this optical network is the lack of arbitration overhead, which allows low minimum latency and high peak utilization for uniform traffic patterns. Furthermore, this optical network uses no switching elements, which results in low optical power loss in the optical waveguides. However, the bandwidth in the optical waveguides is statically allocated, which constrains the available bandwidth between any two sites. For example, in a macrochip that includes 64 chips arranged in an 8×8 array, with a peak system bandwidth of 20 TB/s, a total transmit bandwidth of 320 GB/s and a total receive bandwidth of 320 GB/s for each site, the bandwidth between any two sites is 5 GB/s, because each site has 64 outgoing optical waveguides so that each optical waveguide only has $1/64^{th}$ of the total site bandwidth. This constraint can lead to low performance for workloads that heavily stress a subset of the optical waveguides.

Alternatively, an optical network can enable sharing of optical links, for example, by combining the carrier wavelengths of multiple optical links to form a single logically shared optical link. Optical networks based on sharing can potentially provide higher site-to-site bandwidths compared to a point-to-point optical network, albeit at the cost of arbitration delays in accessing the shared optical link. However, in optical networks there is typically another significant cost associated with sharing: increased power consumption.

Usually, optical networks are static power dominated, including the optical power (laser) and the ring-resonator-modulator tuning power. A continuous-wave laser source is always active regardless of whether the optical link is idle or busy. Moreover, the optical power required for an optical link is a function of the number of devices and the optical power loss per device on that optical link. Because shared optical-network architectures often use additional devices (for example, additional ring-resonator modulators and switches) to enable sharing, the power loss can be significantly larger. The use of additional ring-resonator modulators can also result in larger ring-resonator-modulator tuning power relative to a point-to-point optical network because the ring-resonator modulators often need to be thermally tuned and maintained at the proper operating temperature at all times. Therefore, while sharing designs typically offers higher site-to-site bandwidths, this often comes at the cost of increased static power consumption.

Hence, what is needed is an MCM with an optical network that does not suffer from the above-described problems.

SUMMARY

One embodiment of the present disclosure provides a multi-chip module (MCM). This MCM includes: optical waveguides that convey optical signals, and integrated circuits. The optical waveguides provide dedicated point-to-point optical links between all pairs of the integrated circuits. Moreover, for a given point-to-point optical link between a given pair of integrated circuits, other integrated circuits in the integrated circuits steal access on the given point-to-point optical link without arbitration when communicating information to one of the given pair of integrated circuits so that the given point-to-point optical link is shared by more than the given pair of integrated circuits. Furthermore, the integrated circuits recover errors in messages in the optical signals corrupted by collisions on the given point-to-point optical link using erasure coding.

Note that the optical signals may include data carrier wavelengths that convey data messages and control carrier wavelengths that convey coordination messages for communication among the integrated circuits. Moreover, the control carrier wavelengths may convey: information specifying locations of erasures in the messages associated with the collisions; and instructions to the other integrated circuits to stop stealing access when collisions occur.

In some embodiments, the number of data carrier wavelengths is reduced relative to a point-to-point optical network for the integrated circuits so that a power consumption of the MCM is approximately the same as that of the point-to-point optical network.

Furthermore, a bandwidth between the given pair of integrated circuits via the given point-to-point optical link in the MCM may be larger than that of a point-to-point optical network for the integrated circuits.

Additionally, a bandwidth between the given pair of integrated circuits via the given point-to-point optical link may be guaranteed when needed by either of the given pair of integrated circuits, and stealing of access by the other integrated circuits is opportunistic. Note that the stealing of access on the given point-to-point optical link by one of the other integrated circuits may occur without advance notification to the integrated circuits.

Another embodiment provides a system that includes the MCM.

Another embodiment provides a method for communicating optical signals in the MCM. During the method, the optical signals are communicated between a pair of integrated circuits in the MCM using the dedicated point-to-point optical link between the pair of integrated circuits. Then, one or more other integrated circuits steal access on the point-to-point optical link without arbitration when communicating information to one of the pair of integrated circuits so that the point-to-point optical link is shared by more than the pair of integrated circuits. Moreover, errors in messages in the optical signals corrupted by collisions on the point-to-point optical link are recovered using erasure coding.

BRIEF DESCRIPTION OF THE FIGURES

FIG. 14 is a flow chart illustrating a method for communicating optical signals in an MCM in accordance with an embodiment of the present disclosure.

Figure 1:
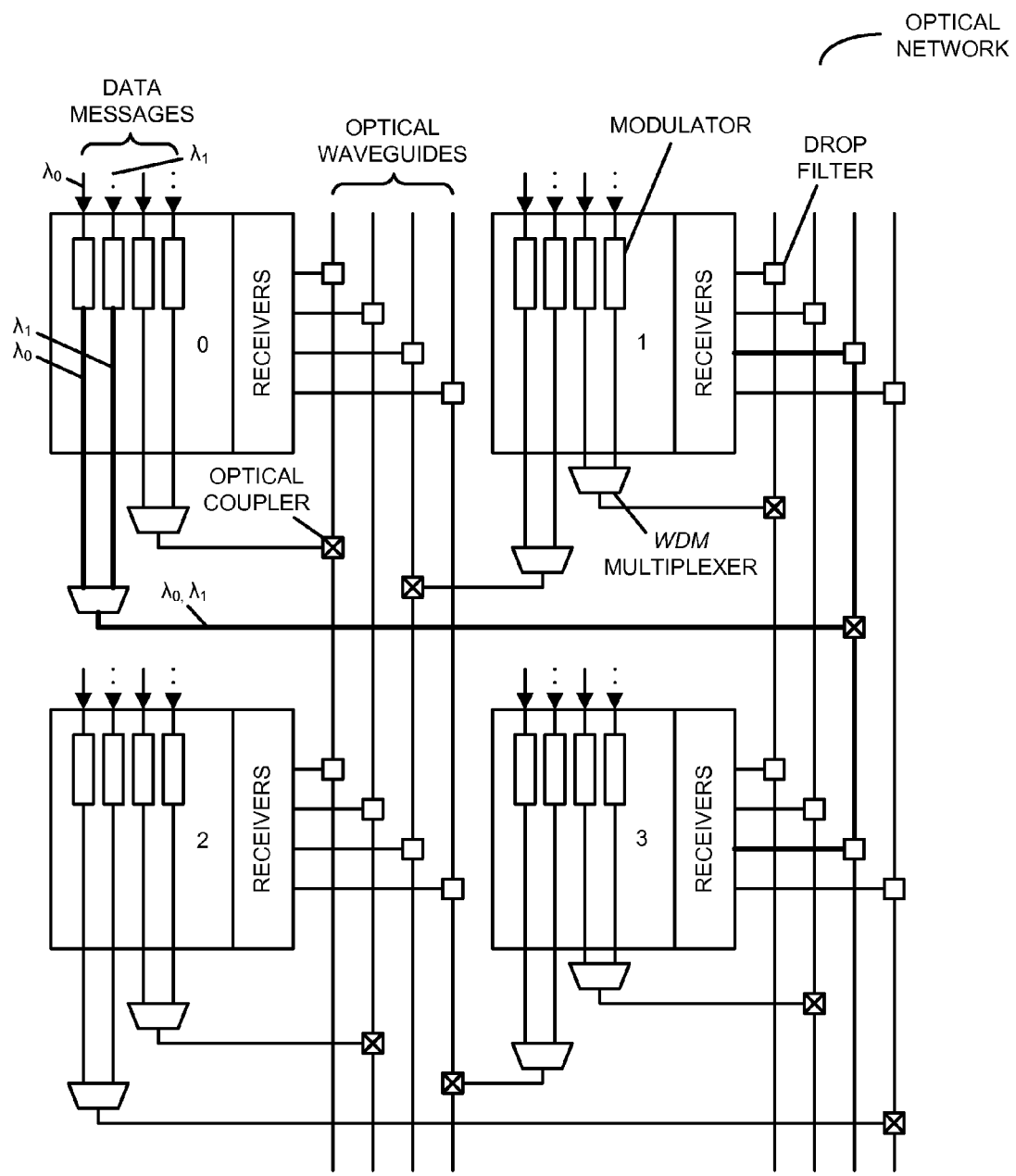
FIG. 1 is a block diagram illustrating an existing static point-to-point optical network.
Figure 2:
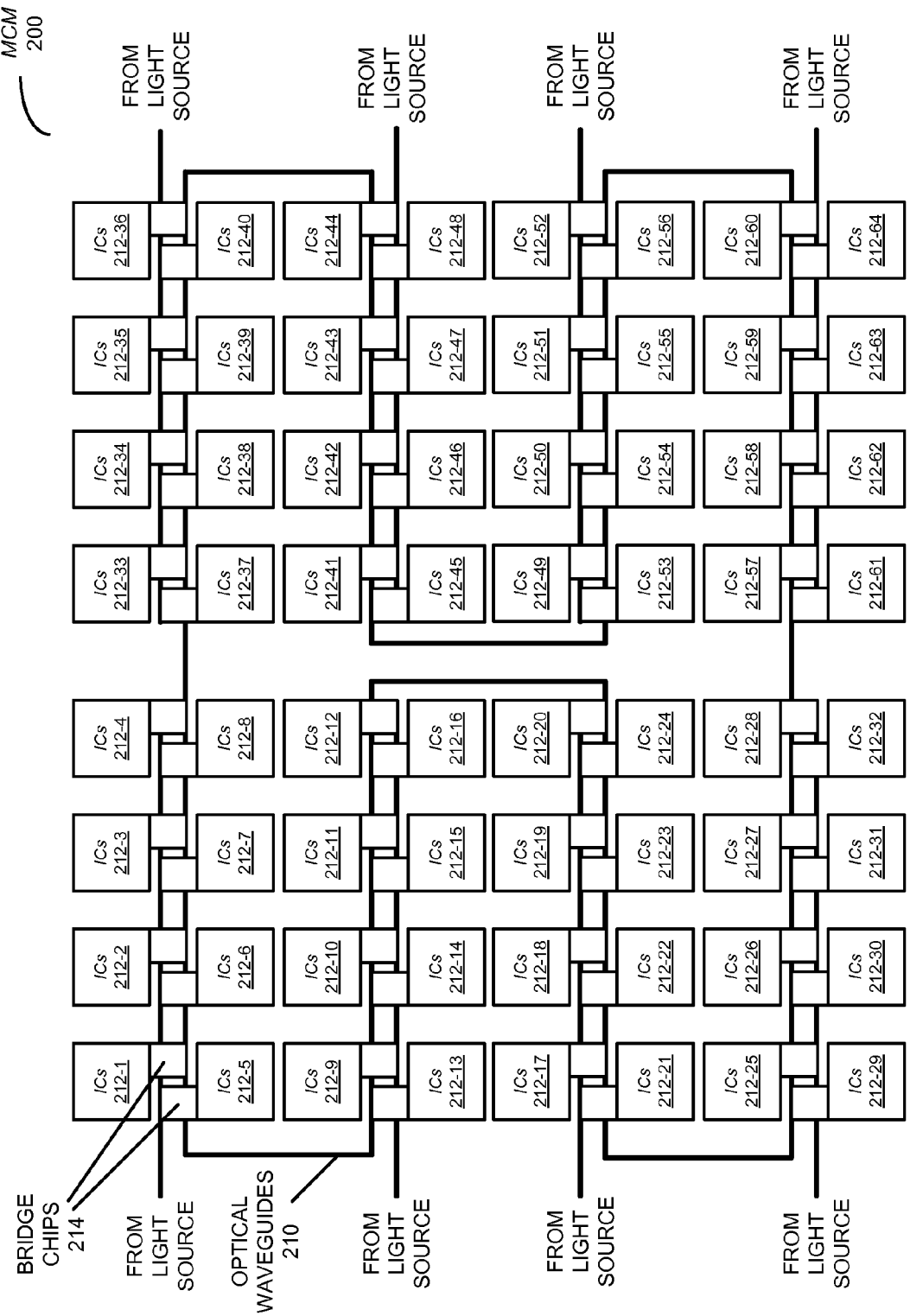
FIG. 2 is a block diagram illustrating optical communication in an MCM in accordance with an embodiment of the present disclosure.

Table 1 provides abort control carrier wavelength functionality in the MCM of FIG. 2 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an MCM, a system that includes the MCM, and a method for communicating optical signals in the MCM are described. In this MCM, integrated circuits (which are sometimes referred to as 'chips') are coupled by optical waveguides that convey optical signals. The optical waveguides provide dedicated point-to-point optical links (logical connections) between all pairs of the integrated circuits. Moreover, for a given point-to-point optical link between a given pair of integrated circuits, other integrated circuits in the integrated circuits steal access on the given point-to-point optical link when communicating information to one of the given pair of integrated circuits so that the given point-to-point optical link is shared by more than the given pair of integrated circuits. Furthermore, the integrated circuits recover errors in messages in the optical signals corrupted by collisions on the given point-to-point optical link using erasure coding.

Using this bandwidth-stealing communication technique, the MCM may provide arbitration-free, uncoordinated sharing of optical links in an optical network. In particular, because each sender site in the MCM has a dedicated point-to-point optical link (with guaranteed access) to every other site in the MCM, the bandwidth-stealing communication technique avoids concerns about starvation (which can occur with larger messages). Furthermore, because a sender site can also steal access on the optical links from one or more other sender sites to the same destination, the sender site can gain access to higher bandwidths for sending a message than in a traditional point-to-point optical network. Note that this architecture does not use an arbitration mechanism (such as a scheduler or token-based sharing) to coordinate the stealing. (Therefore, the bandwidth-stealing communication technique is non-blocking and provides arbitration-free access without delay.) Instead, the MCM recovers from corrupted messages (due to collisions) using erasure coding. When designed with equivalent laser input as a point-to-point optical network, the bandwidth-stealing communication technique can provide larger site-to-site throughput than the point-to-point optical network for a wide variety of configurations (such as power-gating, support for multiple virtual machines, and heterogeneous systems). Moreover, if the number of ring-resonator modulators and the total number of carrier wavelengths in the optical links are restricted, the power consumption of the optical network in the MCM may match that of the point-to-point optical network, which may allow the use of optical components having reasonable optical-loss targets. Therefore, the optical network in the MCM may provide a suitable balance of high bandwidth, low latency and low power consumption for use in interconnect applications.

We now describe embodiments of the MCM. FIG. 2 presents a block diagram illustrating optical communication in an MCM 200, which is sometimes referred to as a 'macro-chip.' This MCM includes: optical waveguides 210 that convey optical signals; integrated circuits (ICs) 212, such as processors and/or memory chips; and bridge chips 214 that optically couple integrated circuits 212 to optical waveguides 210. Optical waveguides 210 provide dedicated point-to-point optical links between all pairs of integrated circuits 212 (i.e., each site in the macrochip has a dedicated point-to-point optical link to every other site via an optical network), which can convey information by modulating one or more carrier wavelengths in the optical signals. Therefore, a sender site can communicate with any destination site using the dedicated point-to-point optical link in a non-blocking fashion. Note that the sender site is sometimes referred to as the 'owner' of the point-to-point optical link to a particular destination site. Moreover, note that each carrier wavelength in a given point-to-point optical link may have one ring-resonator modulator that is used by the sender site to modulate one bit of information per cycle to a destination site.

Because the point-to-point optical links are dedicated, a bandwidth between a given pair of integrated circuits (such as integrated circuits 212-1 and 212-2) via the given point-to-point optical link may be guaranteed when needed by either of the given pair of integrated circuits.

However, for the given point-to-point optical link between the given pair of integrated circuits, one or more other integrated circuits in integrated circuits 212 (which are referred to as 'stealers') steal access on the given point-to-point optical link without arbitration (i.e., the stealing of access on the given point-to-point optical link by one of the other integrated circuits may occur without advance notification to integrated circuits 212) when communicating information to one of the given pair of integrated circuits so that the given point-to-point optical link is shared by more than the given pair of integrated circuits. Therefore, stealing of access by other integrated circuits in integrated circuits 212 on the given point-to-point optical link is opportunistic.

In particular, when the owner is inactive on its point-to-point optical link to a particular destination site, i.e., it does not have any information to send to that destination site, a stealer can use the point-to-point optical link to send its information to that destination site. This may be achieved by statically assigning stealers for every point-to-point optical link. Note that each stealer may have ring-resonator modulators (one for each carrier wavelength it steals) on the point-to-point optical link that it steals from an owner. Thus, the number of ring-resonator modulators on a carrier wavelength in the bandwidth-stealing optical link may be equal to one plus the number of stealers on that optical link. Because a bandwidth-stealing optical link uses more ring-resonator modulators per carrier wavelength compared to a conventional point-to-point optical link in a point-to-point optical network, in general the laser power consumed per carrier wavelength is higher in the bandwidth-stealing communication technique. In order to bring the total laser power consumption of the bandwidth-stealing optical network down to the same level as a point-to-point optical network, the number of carrier wavelengths per optical link may be reduced in the bandwidth-stealing communication technique. This approach can ensure that, by design, a bandwidth-stealing optical network is always matched in terms of laser power consumption to the point-to-point optical network. However, as described further below, even though the bandwidth-stealing communication technique has fewer carrier wavelengths per optical link compared to a point-to-point optical network, because of optical link stealing the bandwidth-stealing optical network can provide higher site-to-site (or node-to-node) bandwidth compared to a point-to-point optical network.

The bandwidth-stealing communication technique can be summarized as follows. Optical links in the bandwidth-stealing communication technique are effectively 'point-to-point,' i.e., every sender site has a dedicated optical link to every other site and is called the owner of the point-to-point optical link. Moreover, the owner is guaranteed service on its point-to-point optical link without any coordination (non-blocking access). However, one or more stealers can opportunistically steal bandwidth (not guaranteed) on a given point-to-point optical link of the owner to the destination site of that point-to-point optical link. This stealing is performed arbitration-free (without notification to the owner or other stealers). In some embodiments, in order to ensure that the total laser power consumption of the bandwidth-stealing optical network is equal to a point-to-point optical network, the number of carrier wavelengths per optical link in the bandwidth-stealing communication technique may be reduced.

Because the communication by a stealer on the given point-to-point optical link is not coordinated with the owner or other stealers, collisions can occur. These collisions can result in errors in the messages in the optical signals in optical waveguides 210. In MCM 200, integrated circuits 212 recover errors in the messages in the optical signals using erasure coding.

In particular, the optical signals may include data carrier wavelengths that convey data messages and control carrier wavelengths that convey coordination messages for communication among integrated circuits 212. As described below with reference to FIGS. 6-8 and Table 1, the control carrier wavelengths may convey: information specifying locations of erasures in the messages associated with the collisions; and instructions to the other integrated circuits to stop stealing access when collisions occur.

In MCM 200, the optical signals may be received from a set of light sources (such as tunable-carrier wavelength lasers that can be tuned to any carrier wavelength in the usable spectrum, or non-tunable lasers having fixed carrier wavelengths), which may be external to MCM 200, and which may be optically coupled to MCM 200 by optical fiber(s). A given integrated circuit in MCM 200 (such as integrated circuit 212-1) may include: a transmitter that modulates at least one of the optical signals when transmitting information to at least another of integrated circuits 212; and a receiver that receives at least one modulated optical signal having a given carrier wavelength associated with the given integrated circuit when receiving information from at least the other of integrated circuits 212. For example, the transmitter may include a ring-resonator modulator. In general, MCM 200 may include control logic that implements the bandwidth-stealing communication technique. This control logic may be centralized or distributed in integrated circuits 212.

As shown in FIG. 2, integrated circuits 212 may be arranged in an array. Some of the optical waveguides 210 may be optically coupled to rows in the array (or, more generally, a first direction in the array), and the other optical waveguides may be optically coupled to columns in the array (or, more generally, a second direction in the array). Furthermore, in integrated circuits 212, the optical waveguides in the different directions may be physically separate components. For example, the optical waveguides in the first and second directions may be implemented in different layers on a substrate (which eliminates waveguide crossings that can cause power loss and cross-talk problems), and MCM 200 may include interlayer couplers (for example, an optical proximity connector) that optically couple the optical waveguides. Note that an interlayer coupler may transfer an optical signal in an optical waveguide in a layer to an optical waveguide in another layer that is vertically above or below the layer. However, in other embodiments (such as that illustrated in FIG. 2), MCM 200 is implemented using a single layer. This architecture is used as an illustration in the discussion that follows.

Optical waveguides 210 may be implemented in a semiconductor layer on a substrate, and the optical signals or light in these optical waveguides may be highly confined because of the big difference between the index of refraction of the semiconductor layer and the surrounding material. While a wide variety of materials can be used in the semiconductor layer, in an exemplary embodiment silicon is used. Furthermore, this silicon semiconductor layer may be disposed on a buried-oxide layer which, in turn, is disposed on the substrate. Once again, a wide variety of materials may be used in the substrate, such as a semiconductor, glass or plastic. In an exemplary embodiment, silicon is used in the substrate, along with silicon dioxide in the buried-oxide layer. Consequently, in some embodiments, the substrate, the buried-oxide layer and the semiconductor layer may comprise a silicon-on-insulator (SOI) technology.

In an exemplary embodiment, optical waveguides 210 convey optical signals (i.e., light) having carrier wavelengths between 1.1-1.7 μm, such as an optical signal having a fundamental carrier wavelength of 1.3 or 1.55 μm. These optical waveguides may have thicknesses between 0.25 and 3 μm, and widths between 0.5 and 3 μm. Note that because optical waveguides 210 may have quasi-rectangular cross-sections, they may be quasi-single mode components. Moreover, the buried-oxide layer may have a thickness between 0.3 and 3 μm.

Figure 3:
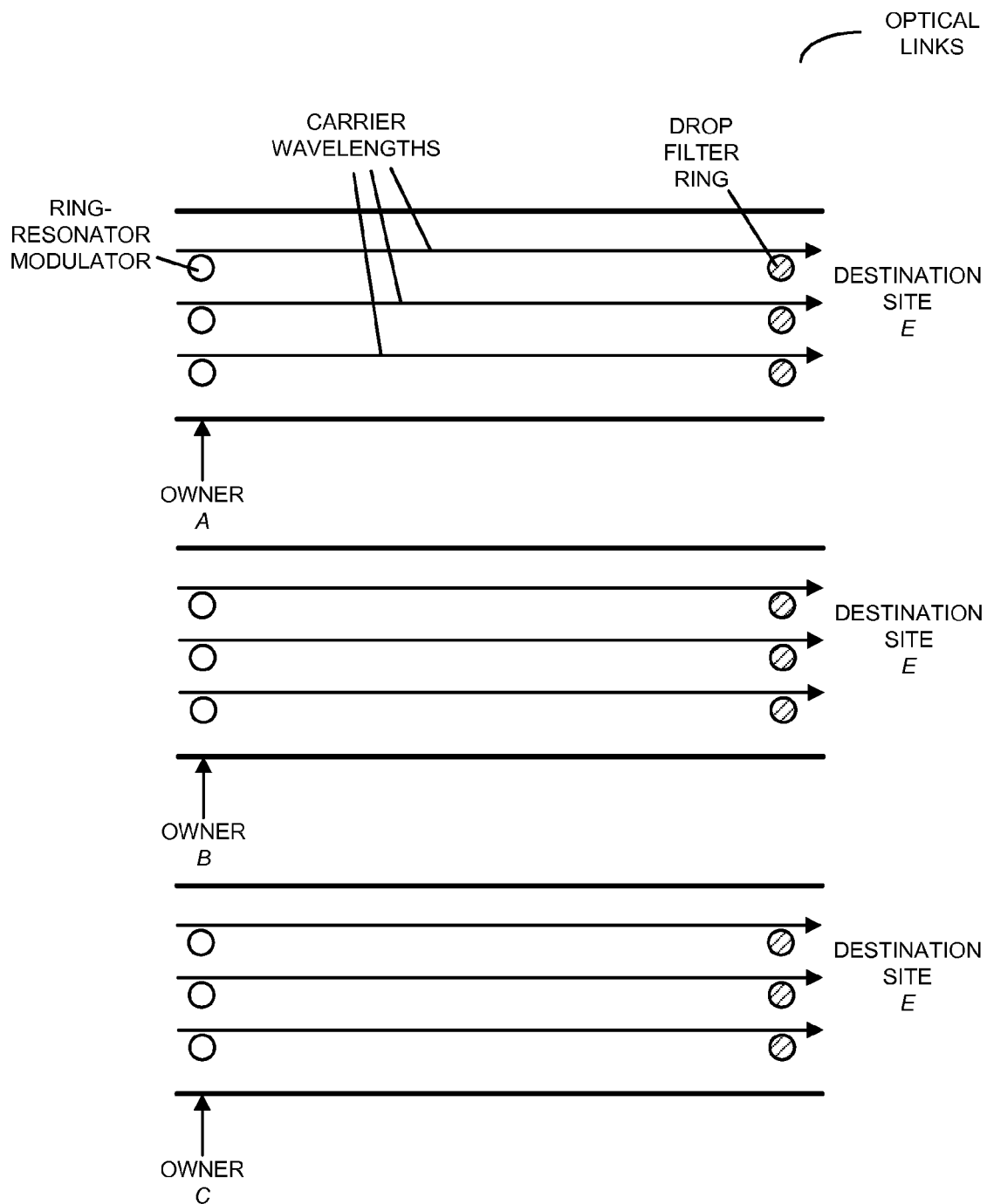
FIG. 3 is a block diagram illustrating point-to-point optical links in the MCM of FIG. 2 in accordance with an embodiment of the present disclosure.

FIG. 3 presents a block diagram illustrating point-to-point optical links in MCM 200 (FIG. 2). In this example, there are three carrier wavelengths per point-to-point optical link. Therefore, each sender site can send three bits per cycle to the destination site E.

Figure 4:
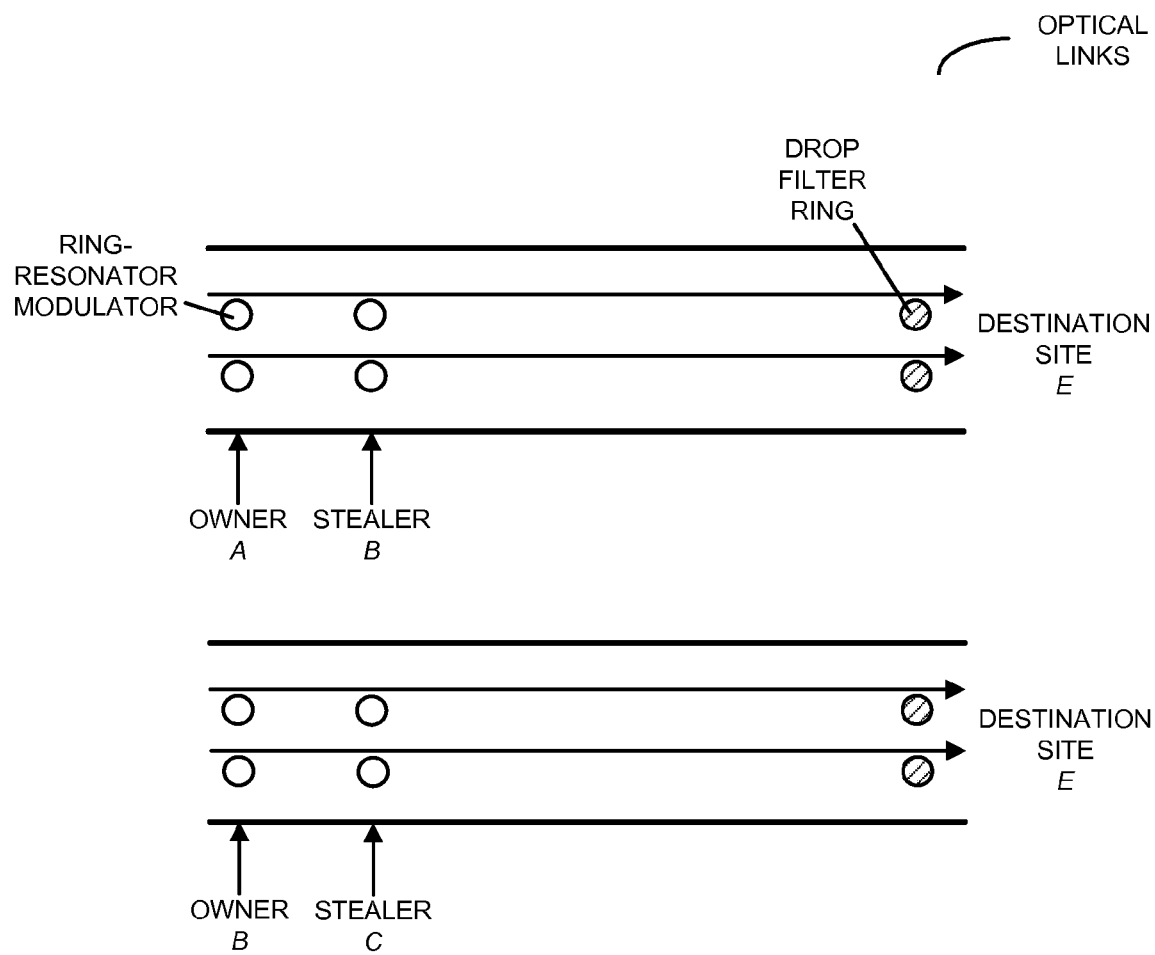
FIG. 4 is a block diagram illustrating bandwidth-stealing optical links in the MCM of FIG. 2 in accordance with an embodiment of the present disclosure.

FIG. 4 presents a block diagram illustrating bandwidth-stealing optical links in MCM 200 (FIG. 2). Every bandwidth-stealing optical link has an owner and one or more stealers on it (FIG. 4 illustrates one stealer per owned optical link). The number of owner point-to-point optical links in the bandwidth-stealing communication technique is equal to the number of point-to-point optical links in the peer-to-peer optical network. However, as noted previously, in some embodiments the number of carrier wavelengths per optical link in the bandwidth-stealing communication technique is less than the number of carrier wavelengths in a peer-to-peer optical link to make the total laser power consumption equal. (That is why each bandwidth-stealing link in FIG. 3 is shown with two carrier wavelengths per link compared to three carrier wavelengths per optical link in the example of FIG. 2. The exact number of carrier wavelengths per optical link in the bandwidth-stealing communication technique may be computed at design time using the sharing losses of ring-resonator modulators. For reasonable sharing loss values, this number may be less than the number of carrier wavelengths in a point-to-point optical link in an optical network.) In spite of having fewer carrier wavelengths per optical link, the bandwidth-stealing communication technique can still achieve higher site-to-site bandwidth than a point-to-point optical link. This may be achieved by stealing carrier wavelengths in other point-to-point optical links to the same destination. For example, for the optical links shown in FIG. 4, sender site B can send two bits per cycle guaranteed on its point-to-point optical link to destination site E, and can opportunistically steal bandwidth on the optical link of site A to send two extra bits per cycle, leading to a total bandwidth of four bits per cycle, provided that site A is not using its point-to-point optical link to destination site E. Therefore, for the optical links shown in FIG. 4, bandwidth stealing allows a site-to-site bandwidth of four bits per cycle while the exclusively point-to-point optical links of FIG. 3 only achieve three bits per cycle. As a consequence, by making use of optical-link stealing, the bandwidth-stealing communication technique can achieve higher site-to-site bandwidths than the peer-to-peer optical network while consuming the same laser power.

Figure 5:
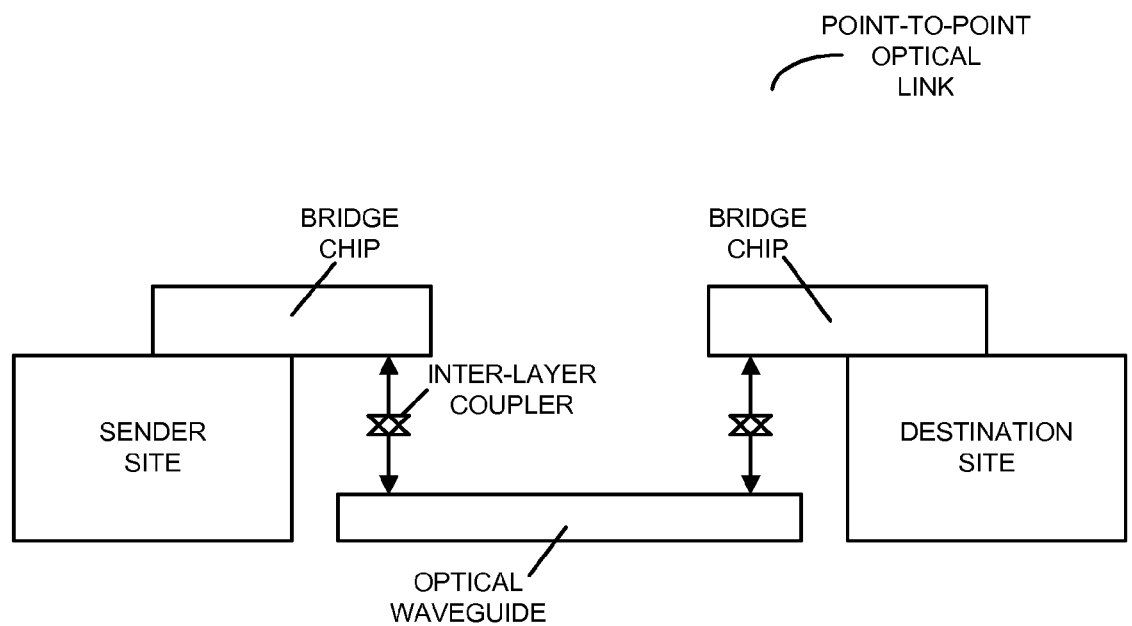
FIG. 5 is a block diagram illustrating a physical point-to-point optical link in the MCM of FIG. 2 in accordance with an embodiment of the present disclosure.

Implementation of bandwidth stealing on the planar macrochip layout shown in FIG. 2 can pose some device-level challenges. For example, in a peer-to-peer optical-network implementation of this layout, there may not be optical ring-resonator modulators in the communication layer. Instead, as shown in FIG. 5, which presents a block diagram illustrating a physical point-to-point optical link in MCM 200 (FIG. 2), ring-resonator modulators at the sender site and the drop-filter rings at the destination site may be incorporated into their respective photonic bridge chips. However, in order to accommodate bandwidth stealing, the stealer ring-resonator modulators may need to be placed in the communication (optical waveguide) layer. This can make the fabrication process more complicated. Also, in order to make multiple ring-resonator modulators on a carrier wavelength feasible, it may be required that any inactive ring-resonator modulator have a loss of less than 0.5 dB. Achieving such optical losses may require ring-resonator modulators with lower losses compared to what can be fabricated in the current technology, or the user device-level techniques, such as ring-resonator parking.

We now describe the operational details of the bandwidth-stealing communication technique. In the bandwidth-stealing communication technique, service may be guaranteed to the owner of a point-to-point optical link. While the stealers on this optical link are not given any guarantees, they can opportunistically try to use it provided it is idle. In order to make the destination site aware of the source of any communication (either from the owner or a stealer), and to ensure that the guarantee conditions are properly enforced, any bandwidth-stealing implementation may have to satisfy some strict requirements. In particular, a bandwidth-stealing implementation may have to meet the following criteria: the owner should get guaranteed service without any delay or coordination (non-blocking access); a stealer can steal bandwidth without arbitration (no notification to the owner or other stealers) and should be notified if it needs to stop stealing; and the destination site needs to know the identity of the received set of bits sent in one cycle across parallel carrier wavelengths (which is referred to as a 'phit'), indicating whether it belongs to the owner or a stealer, or is corrupted because of a collision. In case of a collision, it should correct the phit.

In order to meet these requirements, the bandwidth-stealing communication technique uses erasure coding and some special control carrier wavelengths with every optical link. As an illustration, this functionality will be discussed for optical links with only one stealer (as illustrated in FIG. 4). However, the bandwidth-stealing communication technique can be extended to higher degrees of stealing (i.e., more stealers per carrier wavelength on a given optical link) by using stronger erasure codes and more control carrier wavelengths in every optical link.

In the bandwidth-stealing communication technique, a stealer is allowed to steal or use carrier wavelengths on an optical link without prior notification to the owner (i.e., it is arbitration-free). In this case, whenever a stealer steals on an optical link on which the owner is actively sending data, a collision occurs, causing errors in messages from the owner. These errors are corrected at the destination using erasure coding. In particular, when a collision occurs and is detected by one of integrated circuits 212 (FIG. 2), a stealer is ordered using the control carrier wavelengths to halt stealing, preventing further errors in the message from the owner. This prevention of further errors ensures that the message from the owner is never corrupted to the point that it is uncorrectable at the destination site.

In general, erasure codes provide better error-correction capability compared to random correction codes because the location of potential errors is known at the decoder (the destination site). For example, a parity code can only detect a single bit error, but when used as an erasure code, the location of a potential bit error is known, and it can correct that single bit error. Similarly, a single-error correction and double-error detection (SECDED) code can correct a single bit error, but if the location of potential errors is known, the same SECDED code can be used as an erasure code, leading to an increased capability (i.e., the ability to correct three bit errors).

In the MCM, the location(s) of potential errors due to an unsuccessful stealing attempt (which resulted in a collision because the optical link was busy) can be marked in the control carrier wavelengths. This location information is used by the destination site to perform erasure correction. For example, because the stealer is allowed to steal access on an optical link in an arbitration-free manner, an error can occur in the message from an owner. As noted previously, these errors are corrected at the destination site using erasure coding.

Figure 6:
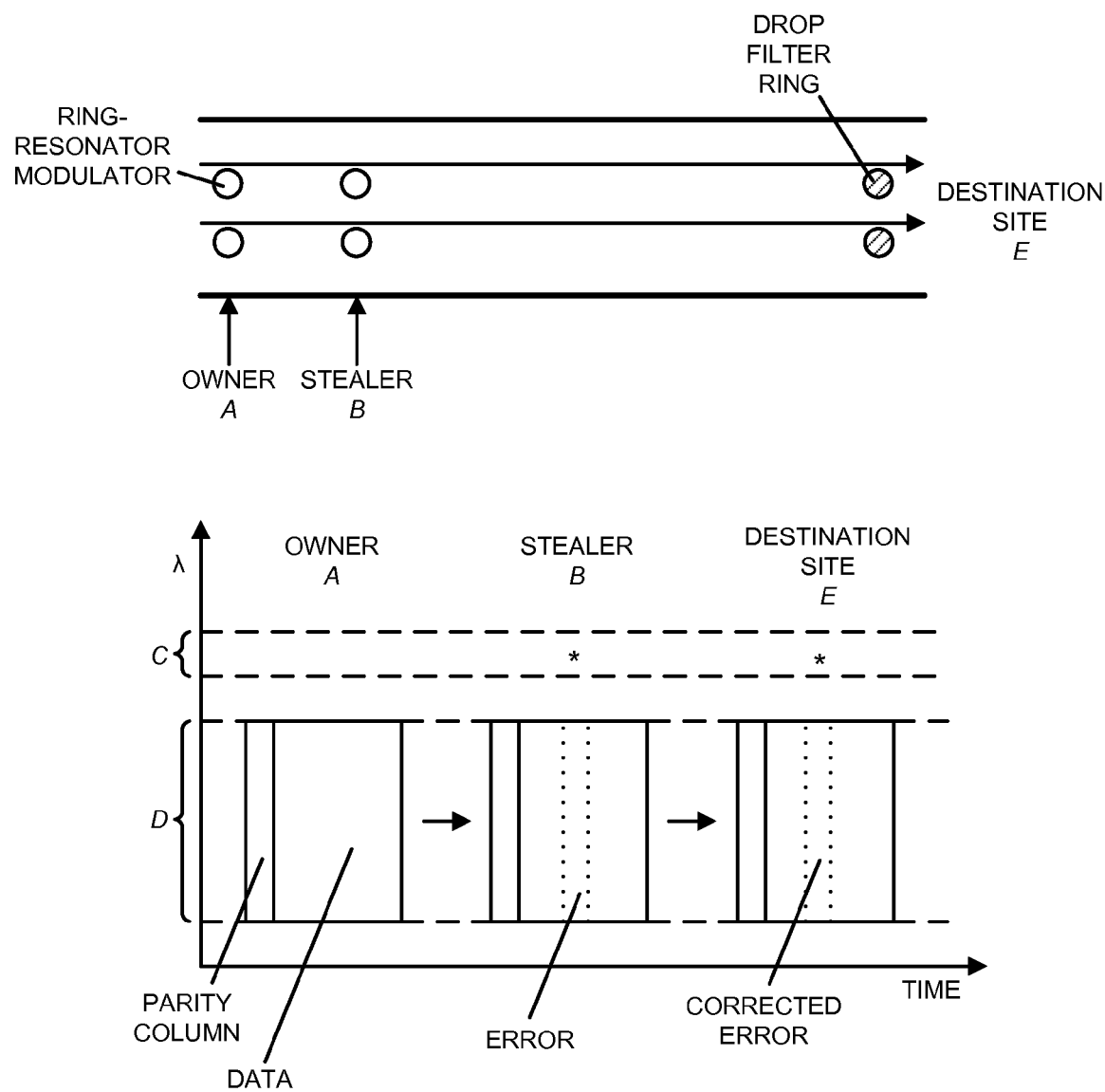
FIG. 6 is a drawing illustrating erasure coding during communication in the MCM of FIG. 2 in accordance with an embodiment of the present disclosure.

This is illustrated in FIG. 6, which presents a drawing illustrating erasure coding during communication in MCM 200 (FIG. 2). In particular, FIG. 6 shows that an optical link in the bandwidth-stealing communication technique has data carrier wavelengths (indicated by D on the y-axis) and control carrier wavelengths (indicated by C on the y-axis) associated with it. The message from the owner (A) has a parity column appended to it. As this message goes past the stealer (B), B can steal on the optical link of the owner leading to an error. This error is marked by site B in the control carrier wavelengths (using the '*' shown in FIG. 6). The control carrier wavelengths also order the stealer to halt stealing. This prevents further errors. When the corrupted message arrives at the destination site (E), the computed parities are compared with the parity column values. If there is a parity mismatch in a particular row, the corresponding bit in that row at the marked location is inverted to correct the bit in error.

Two designs, called 'abort' and 'sense,' are proposed for the control carrier wavelengths in the bandwidth-stealing communication technique. These designs provide the following functionality: they mark the location of corruption for erasure correction at the destination site; they inform the stealer to halt stealing when the owner becomes active to limit the corruption to a single collision; and they inform the destination site of the identity of the received communication (the phit) as from the owner, the stealer or corrupted.

The two proposed control carrier wavelength designs offer different tradeoffs in terms of performance and optical-device considerations. These tradeoffs are discussed further below.

Figure 7:
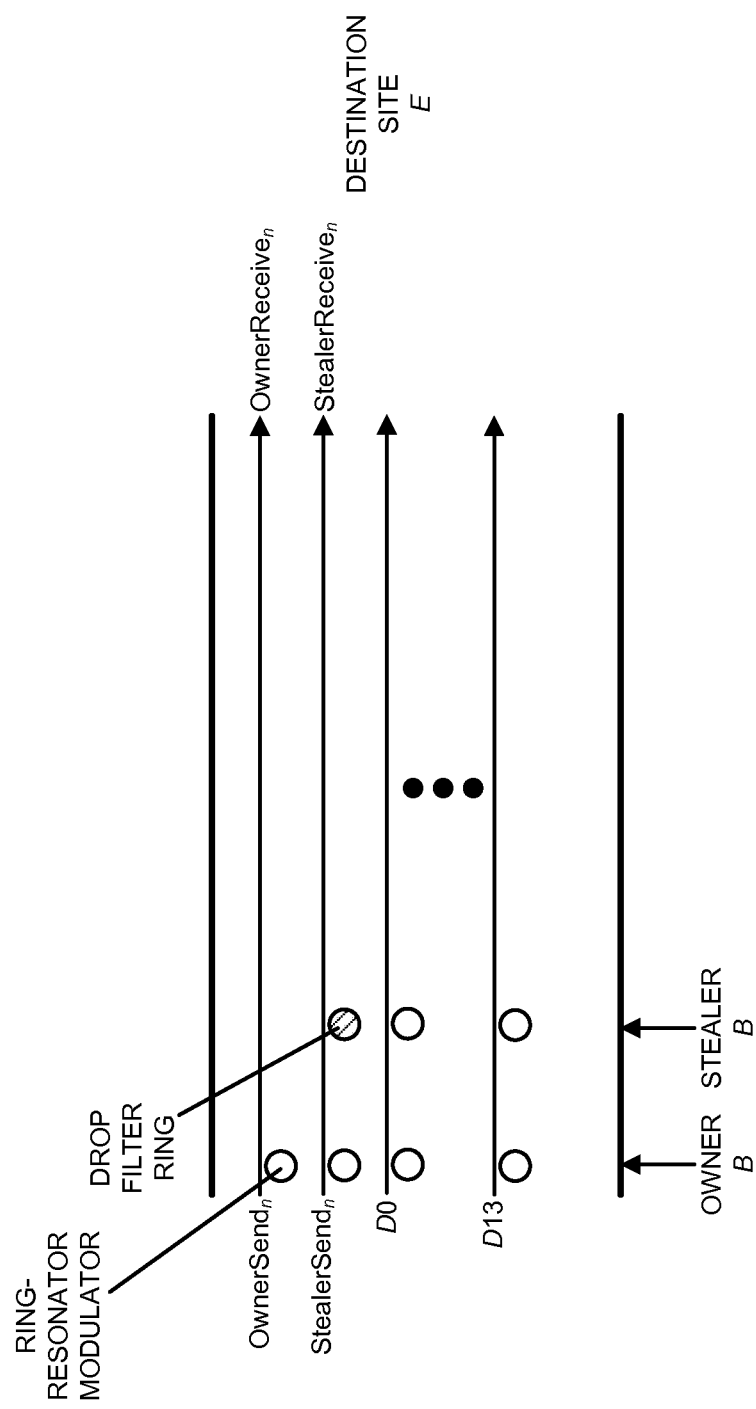
FIG. 7 is a block diagram illustrating control carrier wavelengths in the MCM of FIG. 2 in accordance with an embodiment of the present disclosure.

FIG. 7 presents a block diagram illustrating control carrier wavelengths OwnerSend$_n$ and StealerSend$_n$ in the abort design in MCM 200 (FIG. 2). In FIG. 7, D0-D13 are the data carrier wavelengths of this optical link. The behavior of the control carrier wavelengths in the abort design is given in Table 1.

TABLE 1

| | Owner A | | Stealer B | Destination Site E | | |
|---|---|---|---|---|---|---|
| | OwnerSend$_n$ | StealerSend$_n$ | Collision | OwnerReceive$_n$ | StealerReceive$_n$ | |
| A | 0 | 1 | — | 0 | 1 | A |
| B | 1 | 0 | 0 | 1 | 0 | B |
| A, B | 0 | 1 | 1 | 0 | 0 | E |

If the owner (A) wants to use the optical link, it puts a '01' on the two control carrier wavelengths, OwnerSend$_n$ and StealerSend$_n$, respectively. But, if the owner (A) is not using the optical link, it puts a '10' on the control carrier wavelengths. Whenever the stealer (B) steals on the optical link, it turns on the drop filter. The drop filter pulls out all light (bit) travelling on the StealerSend$_n$ carrier wavelength. If a value of '0' is read by the drop filter, then the stealer (B) knows that a collision did not occur. However, if the drop filter reads a value of '1,' then the stealer (B) knows that a collision has just happened. It then suspends stealing. At the destination site, a '01' for OwnerReceive$_n$ and StealerReceive$_n$ indicates the phit is from owner (A), a '10' indicates the phit is from stealer (B), and a '00' represents a corrupted phit. Thus, in the abort design, the functionality of Table 1 is able to perform the required functions listed above.

Figure 8:
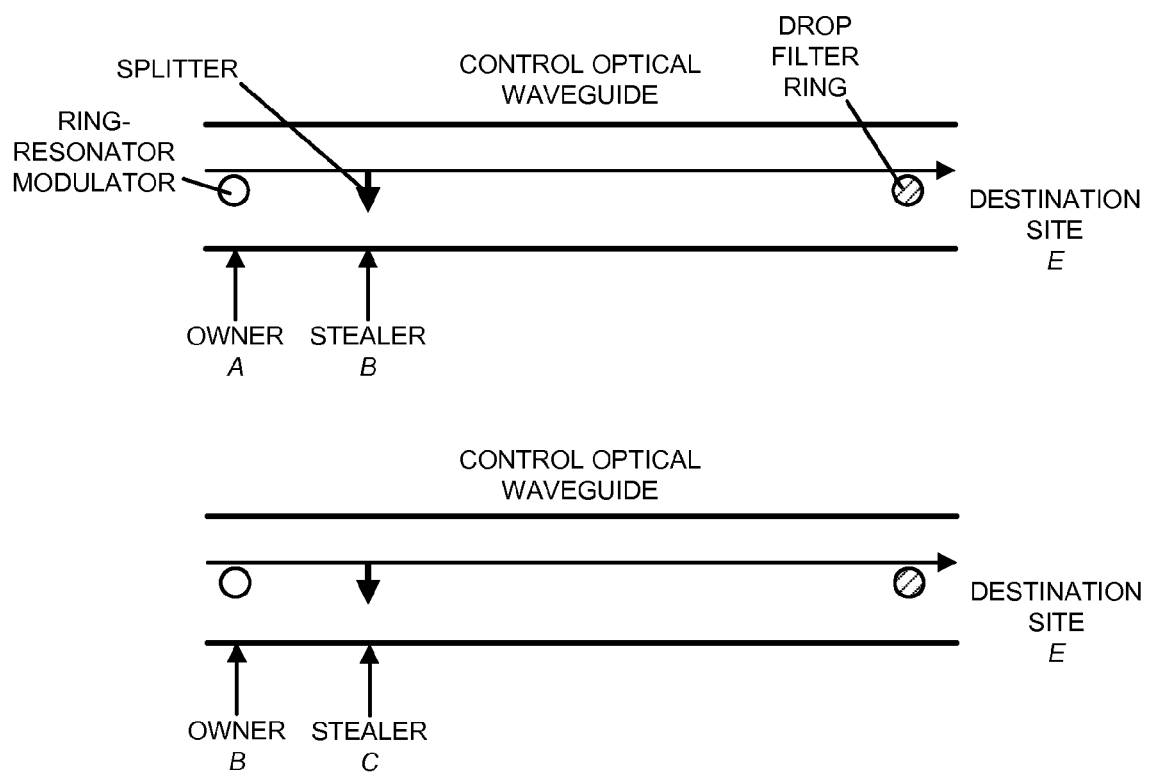
FIG. 8 is a block diagram illustrating control carrier wavelengths in the MCM of FIG. 2 in accordance with an embodiment of the present disclosure.

As shown in FIG. 8, which presents a block diagram illustrating control carrier wavelengths in MCM 200 (FIG. 2), the sense design uses separate control optical waveguides for control (in this example, optical links A and B). In FIG. 8, there is only one control carrier wavelength per control optical waveguide called OwnerSend (which is henceforth abbreviated as OS'). The control carrier wavelength on the optical link of owner A is denoted by OS(A). Similarly, the control carrier wavelength associated with the optical link of owner B is denoted by OS(B). Before describing the functionality further, note that: OS(A)=1' indicates that the owner A puts a '1' on its control carrier wavelength; 'OS(A)==1' indicates that the value of the control carrier wavelength on the optical link of owner A is 1; and 'OS(A)==–' indicates that the value of the control carrier wavelength on the optical link of owner A is irrelevant for the state transition.

Figure 9:
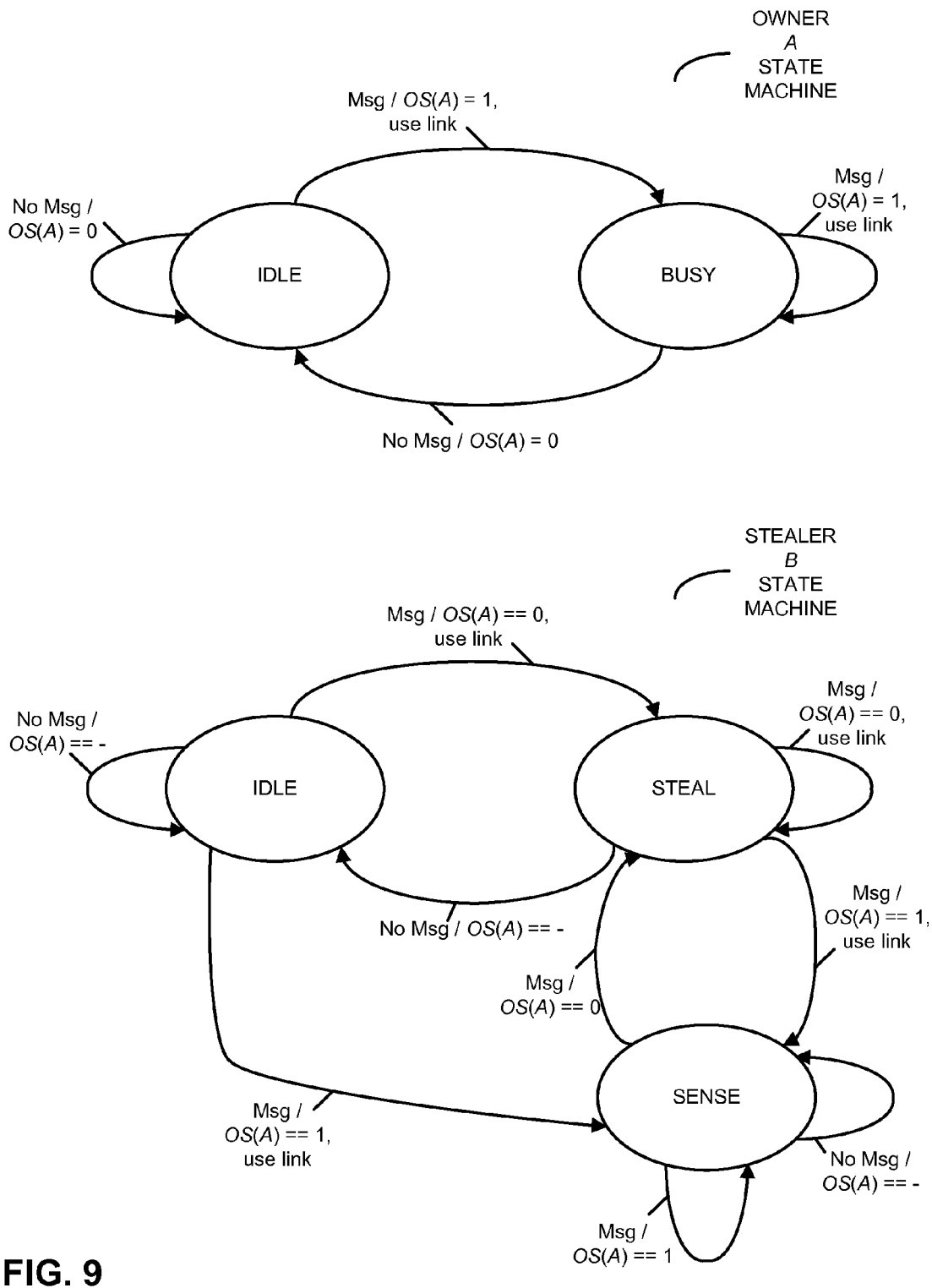
FIG. 9 is a drawing illustrating state machines controlling an owner and a stealer of bandwidth on a point-to-point optical link in the MCM of FIG. 2 in accordance with an embodiment of the present disclosure.

FIG. 9 presents a drawing illustrating state machines controlling an owner A and a stealer B of bandwidth on a point-to-point optical link of owner A in MCM 200 (FIG. 2). In FIG. 9, note that, in the sense design, owner A sets different values on its control carrier wavelength OS(A). Stealer (B) reads the value set by owner A on OS(A) and functions accordingly. Moreover, destination site E reads the values of both OS(A) and OS(B) in order to properly identify the received communication on the optical link of owner A.

Figure 10:
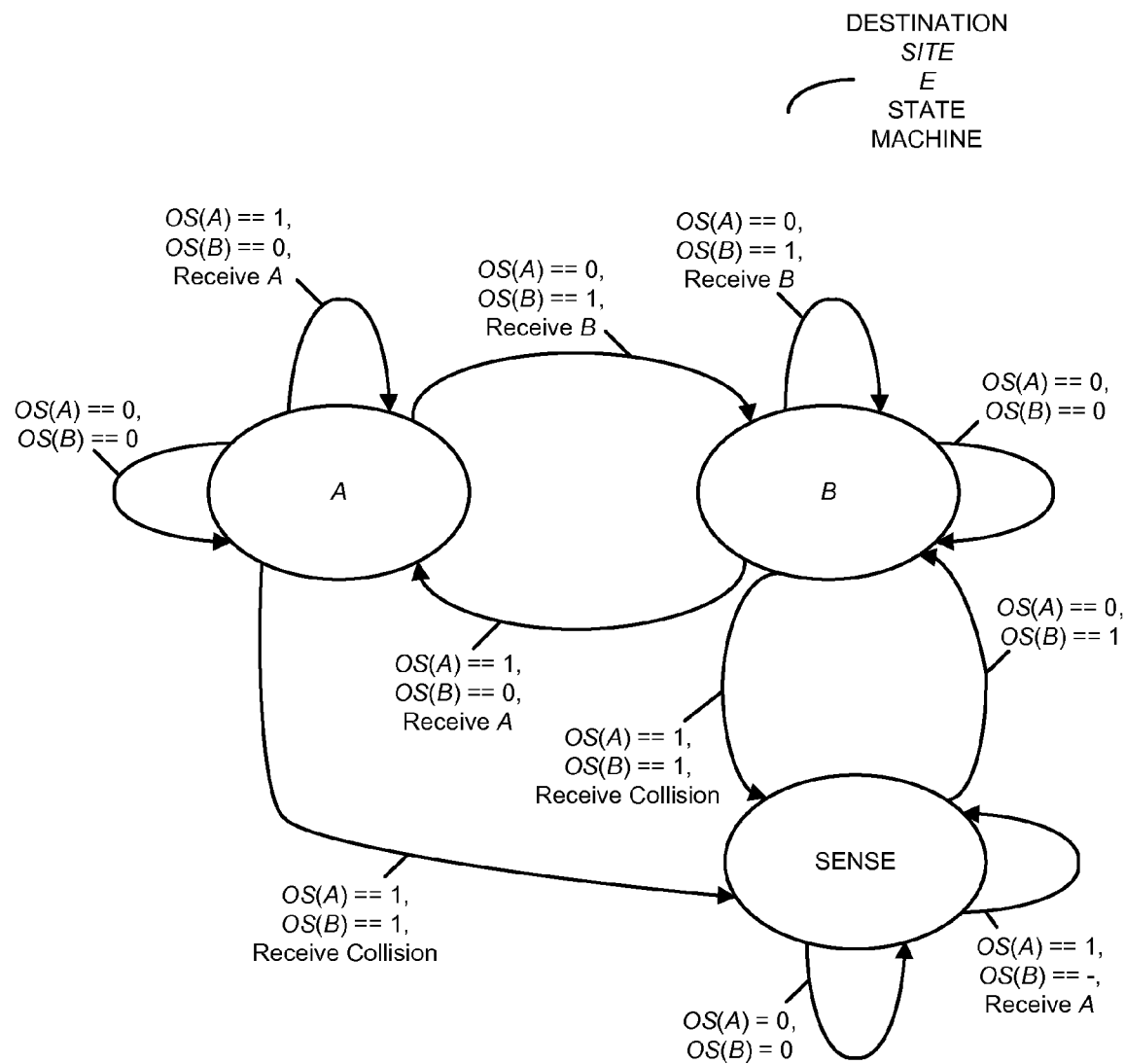
FIG. 10 is a drawing illustrating state machines controlling a destination on the point-to-point optical link of the owner in FIG. 9 in accordance with an embodiment of the present disclosure.

In the sense design, the control functionality of owner A, stealer B, and destination site E depends on both the current and previous values (the state) of the control carrier wavelengths (OS) (thus, the functionality is represented using state machines in FIGS. 9 and 10 instead of the table used for the abort design). The state machine diagram of owner A shows that, whenever owner A uses its optical link, it puts a '1' on OS(A). The functionality of stealer B then depends on the value of OS(A). From the state machine of stealer B, it is clear that it can be in one of two states when it has a message to send: 'STEAL' or 'SENSE.' In the STEAL state, stealer B can actively steal on the optical link of owner A. If owner A suddenly becomes active (OS(A)==1), then stealer B transitions to the SENSE state. While in this state, stealer B does not steal. Instead, stealer B waits for an opening on the optical link of owner A so that it can revert back to stealing.

As shown in FIG. 10, which presents a drawing illustrating state machines controlling how a destination site E behaves on the point-to-point optical link of owner A in FIG. 9, the destination state machine needs to monitor the control carrier wavelength of both owner A and stealer B. From the state machine, it is clear that when OS(A)==1 and OS(B)==1 are observed after valid receptions from owner A or stealer B, then the state machine transitions to the SENSE state and knows that a collision has occurred. While in the SENSE state, the only valid phit that is received is from the owner A. The remainder of the functionality in the state machines in FIGS. 9 and 10 can be implemented as is known to one of skill in the art.

Figure 11:
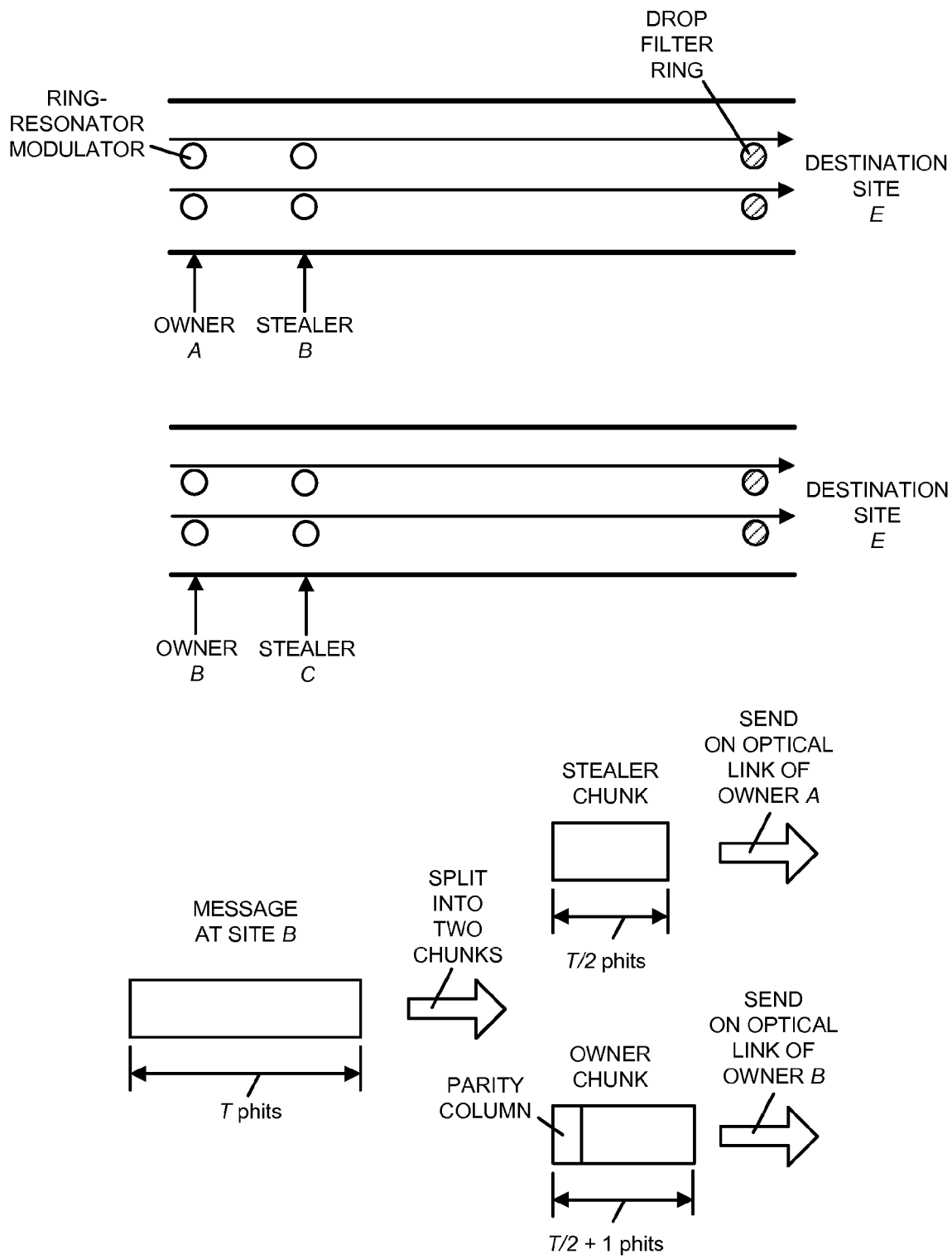
FIG. 11 is a drawing illustrating operation of a bandwidth-stealing communication technique in the MCM of FIG. 2 in accordance with an embodiment of the present disclosure.

When a new message arrives at a sender site, the bandwidth-stealing communication technique performs the operations shown in FIG. 11, which presents a drawing illustrating operation of the bandwidth-stealing communication technique in MCM 200 (FIG. 2). In particular, when sender site B has a message with T phits (which is known in advance) to send to destination site E, it splits the message occupying T cycles into two chunks: an owner chunk and a stealer chunk. Then, sender site B parity protects the owner chunk and sends it on the optical link of owner B, and sends the stealer chunk on the optical link of owner A.

If a collision occurs, in the abort design, sender site B terminates the stealing conservatively until $\{T/2+1\}$ cycles. Alternatively, in the sense design, sender site B halts stealing and resumes if an opening is sensed. Furthermore, in these cases sender site B parity protects any unsent phits of the stealer chunk (because of a collision) and sends them on the optical link of owner B when the owner chunk finishes. Note that if no collisions are encountered then the complete message is sent in $\{T/2+1\}$ cycles, and if bandwidth stealing is completely unsuccessful then the message takes $\{T+2\}$ cycles.

Based on evaluations of the bandwidth-stealing communication technique, note that there are device-level tradeoffs in the choice of the abort design versus the sense design. In particular, the control carrier wavelengths in the abort design can be accommodated with the data carrier wavelengths of an optical link in a single optical waveguide. In contrast, the sense design may use separate optical waveguides for the control carrier wavelengths. However, the sense design may use fewer optical ring-resonator modulators than the abort design and, therefore, may be more energy efficient.

In terms of performance, the sense design can potentially provide better performance than the abort design. The performance difference becomes more pronounced if the optical network supports messages of very large and very small sizes with a high percentage of mixture between them, e.g., 50% very large messages and 50% very small messages.

In order to simulate the performance of the bandwidth-stealing communication technique, optical-network communication traces were collected for five message-passing workloads of the NAS parallel benchmark suite. These communication traces were then simulated for the bandwidth-stealing communication technique as well as the peer-to-peer optical network. The optical network execution time as well as the total energy expended by each optical network was then compared.

Based on the total energy consumed times the delay in completing the application run (the energy-delay product or EDP), both of the bandwidth-stealing designs (abort and sense) offer improved performance over the peer-to-peer optical network on the key evaluation metrics (energy and delay) on all five benchmarks. On average, even with the use of large messages and low-radix interconnect traffic, the bandwidth-stealing communication technique gives an EDP improvement of up to 23% over a peer-to-peer optical network on the macrochip layout of FIG. 2. Moreover, the increased site-to-site bandwidth may reduce the serialization delay of small messages at low offered loads (a traffic behavior that is typical of shared memory systems). Furthermore, when the bandwidth-stealing communication technique is employed in a partitioned cluster (such as power-gated sites, multiple virtual machines or a heterogeneous cluster), a 27% improvement in performance may be obtained on an arbitrary traffic pattern.

Figure 12:
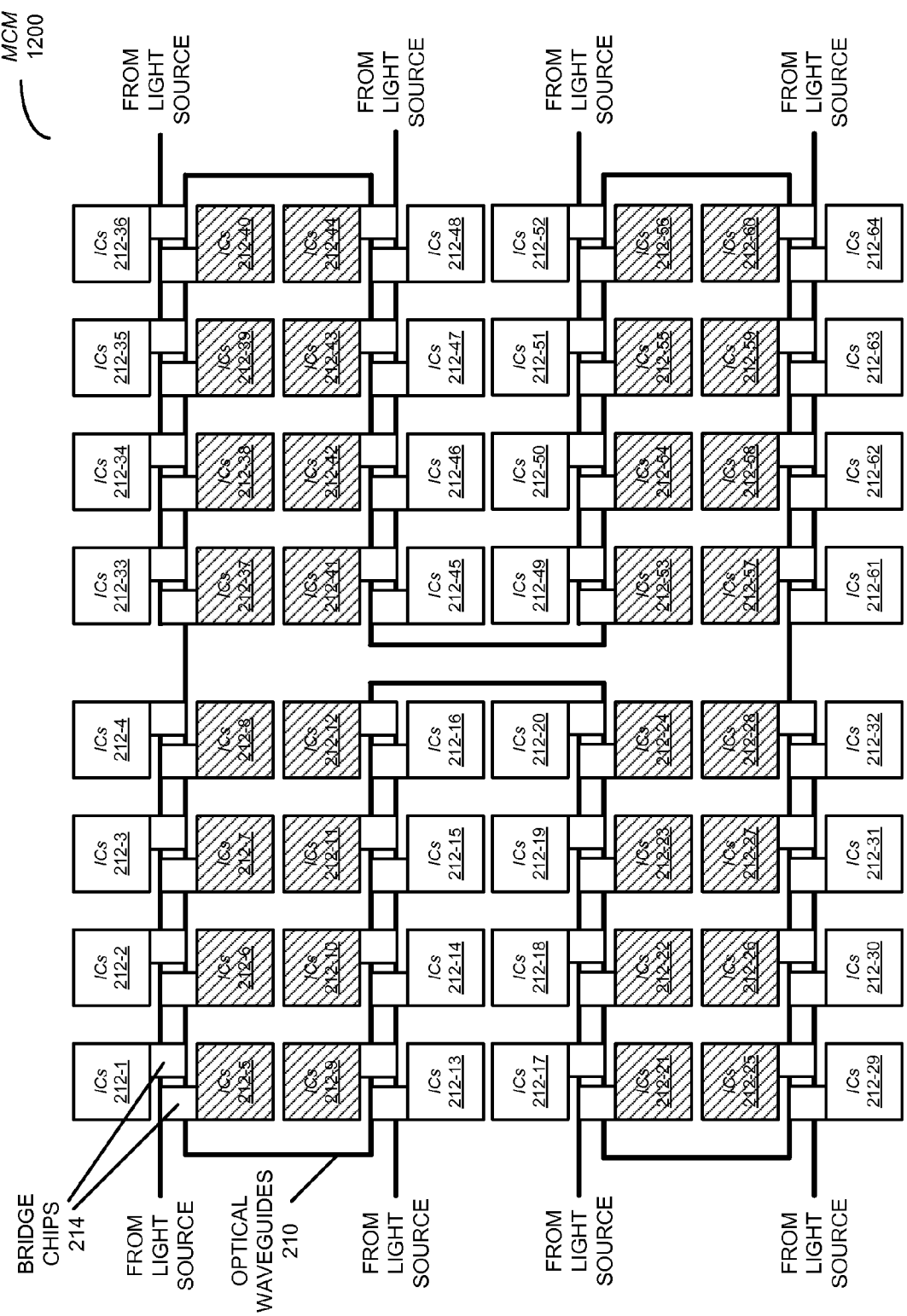
FIG. 12 is a block diagram illustrating collision-free subsets in an MCM that implements the bandwidth-stealing communication technique in accordance with an embodiment of the present disclosure.

An interesting property of the bandwidth-stealing communication technique is that depending on the stealing pattern that is implemented on a given layout, certain subsets of sites can be constructed such that if the sites within a subset only communicate among themselves and there is no cross-communication between the subsets, then the subset optical networks are always collision-free. This property is shown in FIG. 12, which presents a block diagram illustrating collision-free subsets in MCM 1200. Using a particular stealing pattern, two sets of sites called Set0 and Set1 (which are indicated by hash marks), each with 32 sites, are constructed. If there is no cross-communication between these subsets, then a collision-free system can be achieved.

An architectural implication of this is that a cluster of sites on the macrochip can be partitioned into multiple virtual machines such that sites within a given virtual machine always steal from sites outside the given virtual machine. With no inter-virtual-machine communication, this architecture provides higher site-to-site bandwidth (because stealing is guaranteed to be successful), and lower message latencies when compared to a peer-to-peer optical network.

To demonstrate this in a simulation, four message-passing applications were run concurrently as a virtual machine on the macrochip (FIG. 2). Using the collision-free subset property of bandwidth stealing, each 16-site virtual machine was mapped to a special cluster of sites in the optical network. Because of the existence of collision-free subsets, the bandwidth-stealing communication technique was able to achieve performance gains (optical network speedup) over a peer-to-peer optical network without incurring collisions.

Figure 13:
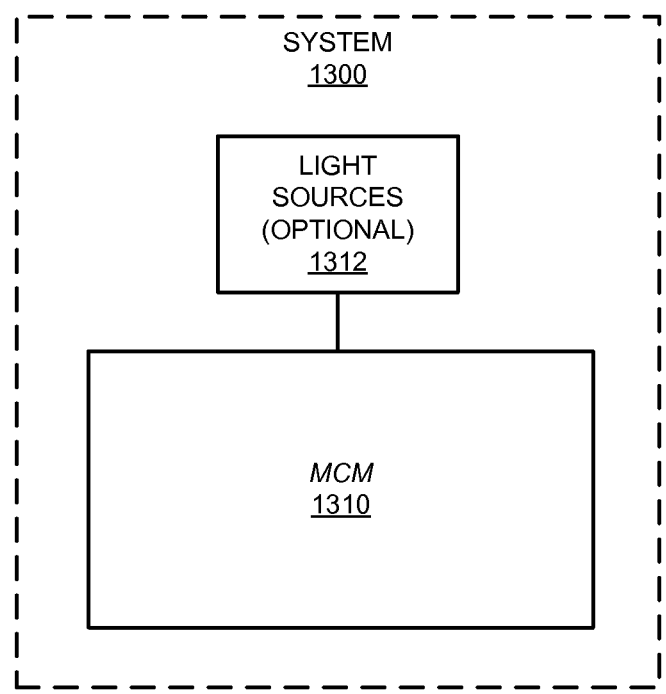
FIG. 13 is a block diagram illustrating a system that includes an MCM in accordance with an embodiment of the present disclosure.

The preceding embodiments of the MCM may be used in a variety of applications. This is shown in FIG. 13, which presents a block diagram illustrating a system 1300 that includes an MCM 1310 and an optional set of light sources 1312.

System 1300 may include: a VLSI circuit, a switch, a hub, a bridge, a router, a communication system, a storage area optical network, a data center, an optical network (such as a local area optical network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device (such as a tablet computer), a supercomputer, an optical network-attached-storage (NAS) system, a storage-area-network (SAN) system, and/or another electronic computing device. Note that a given computer system may be at one location or may be distributed over multiple, geographically dispersed locations.

The preceding embodiments of the MCM, as well as system 1300, may include fewer components or additional components. Although these embodiments are illustrated as having a number of discrete items, these MCMs and the system are intended to be functional descriptions of the various features that may be present rather than structural schematics of the embodiments described herein. Consequently, in these embodiments two or more components may be combined into a single component, and/or a position of one or more components may be changed. For example, the set of light sources or lasers may be included on the MCM. In addition, functionality in the preceding embodiments of the MCMs and the system may be implemented more in hardware and less in software, or less in hardware and more in software, as is known in the art. For example, functionality may be implemented in one or more application-specific integrated circuits (ASICs) and/or one or more digital signal processors (DSPs).

While the preceding embodiments have been illustrated with particular components, configurations and optical network architectures, a wide variety of additional variations to the optical network in the embodiments of the MCM may be used, as is known to one of skill in the art, including: the use of additional or fewer components, arbitration techniques (as needed), etc.

As noted previously, the bandwidth-stealing communication technique may be extended to higher stealing degrees at the cost of higher coding and control overheads. For example, moving to three-way stealing incurs higher overheads in terms of control wavelengths and parity bits associated with erasure coding. In two-way stealing, an owner A may protect its transmission against one possible collision by a stealer B. In three-way stealing, owner A may protect against two possible collisions, one from each stealer (such as stealers B and C). Thus, a higher capability code is required beyond the simple parity. Design of erasure codes with higher capabilities is known in the art. In addition, in three-way stealing, the intermediate stealer B (between owner A and stealer C) also may need to protect its information against a collision from the other stealer C further down the optical link. Thus, owner A may need to protect against two collisions and stealer B may need to protect against a single collision. Note that stealer C does not require any protection. To generalize, a sender site on a bandwidth-stealing link may need to protect its information against as many collisions as the number of sender sites down the optical link. Therefore, the owner needs the most protection while the final stealer on an optical link does not require any protection.

Moving to higher stealing degrees also may increase the control overheads as more information needs to be conveyed to the destination site for correct identification of a received phit (which can come from the owner or anyone of the stealers). More precisely, the increase in the control carrier wavelengths usually only happens for the abort design. In the sense design, the complexity does not come from the control carrier wavelengths (every optical link typically only requires one control carrier wavelength regardless of the sharing degree). Instead, the complexity for the sense design comes from state machines that implement the control functionality. That is, moving to higher sharing degrees in the sense design increases the number of states and transitions in the state machines. In this way, the functionalities of the abort or sense design can be extended to higher stealing degrees. This approach involves adding more entries to the table that represents abort functionality, or adding more states to the state machines that implement sense functionality.

We now describe embodiments of the method. FIG. 14 presents a flow chart illustrating a method 1400 for communicating optical signals in an MCM, such as MCM 200 (FIG. 2). During the method, the optical signals are communicated between a pair of integrated circuits in the MCM using the dedicated point-to-point optical link between the pair of integrated circuits (operation 1410). Then, one or more other integrated circuits steal access on the point-to-point optical link without arbitration when communicating information to one of the pair of integrated circuits (operation 1412) so that the point-to-point optical link is shared by more than the pair of integrated circuits. Moreover, errors in messages in the optical signals corrupted by collisions on the point-to-point optical link are recovered using erasure coding (operation 1414).

In some embodiments of method 1400, there are additional or fewer operations. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A multi-chip module (MCM), comprising:
optical waveguides configured to convey optical signals; and
integrated circuits optically coupled to the optical waveguides, wherein the optical waveguides provide dedicated point-to-point optical links between all pairs of the integrated circuits;
wherein, for a given point-to-point optical link between a given pair of integrated circuits, other integrated circuits in the integrated circuits are configured to steal access on the given point-to-point optical link without arbitration when communicating information to one of the given pair of integrated circuits so that the given point-to-point optical link is shared by more than the given pair of integrated circuits;

wherein the integrated circuits are configured to recover errors in messages in the optical signals corrupted by collisions on the given point-to-point optical link using erasure coding;

wherein the optical signals include data carrier wavelengths that convey data messages and control carrier wavelengths that convey coordination messages for communication among the integrated circuits; and wherein the control carrier wavelengths convey information specifying locations of erasures in the messages associated with the collisions, information specifying the other integrated circuits that sent the messages, and instructions to the other integrated circuits to stop stealing access when collisions occur.

2. The MCM of claim 1, wherein the number of data carrier wavelengths is reduced relative to a point-to-point optical network for the integrated circuits so that a power consumption of the MCM is approximately the same as that of the point-to-point optical network.

3. The MCM of claim 1, wherein a bandwidth between the given pair of integrated circuits via the given point-to-point optical link in the MCM is larger than that of a point-to-point optical network for the integrated circuits.

4. The MCM of claim 1, wherein a bandwidth between the given pair of integrated circuits via the given point-to-point optical link is guaranteed when needed by either of the given pair of integrated circuits; and wherein stealing of access by the other integrated circuits is opportunistic.

5. The MCM of claim 4, wherein stealing of access on the given point-to-point optical link by one of the other integrated circuits occurs without advance notification to the integrated circuits.

6. A system, comprising a multi-chip module (MCM), wherein the MCM includes:

optical waveguides configured to convey optical signals; and integrated circuits optically coupled to the optical waveguides, wherein the optical waveguides provide dedicated point-to-point optical links between all pairs of the integrated circuits;

wherein, for a given point-to-point optical link between a given pair of integrated circuits, other integrated circuits in the integrated circuits are configured to steal access on the given point-to-point optical link without arbitration when communicating information to one of the given pair of integrated circuits so that the given point-to-point optical link is shared by more than the given pair of integrated circuits;

wherein the integrated circuits are configured to recover errors in messages in the optical signals corrupted by collisions on the given point-to-point optical link using erasure coding;

wherein the optical signals include data carrier wavelengths that convey data messages and control carrier wavelengths that convey coordination messages for communication among the integrated circuits; and wherein the control carrier wavelengths convey information specifying locations of erasures in the messages associated with the collisions, information specifying the other integrated circuits that sent the messages, and instructions to the other integrated circuits to stop stealing access when collisions occur.

7. The system of claim 6, wherein the number of data carrier wavelengths is reduced relative to a point-to-point optical network for the integrated circuits so that a power consumption of the MCM is approximately the same as that of the point-to-point optical network.

8. The system of claim 6, wherein a bandwidth between the given pair of integrated circuits via the given point-to-point optical link in the MCM is larger than that of a point-to-point optical network for the integrated circuits.

9. The system of claim 6, wherein a bandwidth between the given pair of integrated circuits via the given point-to-point optical link is guaranteed when needed by either of the given pair of integrated circuits; and wherein stealing of access by the other integrated circuits is opportunistic.

10. The system of claim 9, wherein stealing of access on the given point-to-point optical link by one of the other integrated circuits occurs without advance notification to the integrated circuits.

11. A method for communicating optical signals in a multi-chip module (MCM), the method comprising:

communicating the optical signals between a pair of integrated circuits in the MCM using a dedicated point-to-point optical link between the pair of integrated circuits;

stealing access by one or more other integrated circuits on the point-to-point optical link without arbitration when communicating information to one of the pair of integrated circuits so that the point-to-point optical link is shared by more than the pair of integrated circuits;

recovering errors in messages in the optical signals corrupted by collisions on the point-to-point optical link using erasure coding;

wherein a bandwidth between the given pair of integrated circuits via the given point-to-point optical link is guaranteed when needed by either of the given pair of integrated circuits; and wherein stealing of access by the other integrated circuits is opportunistic.

12. The method of claim 11, wherein the optical signals include data carrier wavelengths that convey data messages and control carrier wavelengths that convey coordination messages for communication among the integrated circuits.

13. The method of claim 12, wherein the control carrier wavelengths convey:

information specifying locations of erasures in the messages associated with the collisions;

information specifying the other integrated circuits that sent the messages; and instructions to the other integrated circuits to stop stealing access when collisions occur.

14. The method of claim 12, wherein the number of data carrier wavelengths is reduced relative to a point-to-point optical network for the integrated circuits so that a power consumption of the MCM is approximately the same as that of the point-to-point optical network.

15. The method of claim 11, wherein a bandwidth between the given pair of integrated circuits via the given point-to-point optical link in the MCM is larger than that of a point-to-point optical network for the integrated circuits.

* * * * *